(12) United States Patent
Fritsch et al.

(10) Patent No.: US 11,668,599 B2
(45) Date of Patent: *Jun. 6, 2023

(54) SHELF BRACKET ASSEMBLY

(71) Applicant: Bizerba SE & Co. KG, Balingen (DE)

(72) Inventors: Andreas Fritsch, Balingen (DE); Frank Metzger, Albstadt (DE); Harald Witte, Balingen (DE); Luca Kallmann, Wellendingen (DE)

(73) Assignee: BIZERBA SE & CO. KG, Balingen (DE)

( * ) Notice: Subject to any disclaimer, the term of this patent is extended or adjusted under 35 U.S.C. 154(b) by 203 days.

This patent is subject to a terminal disclaimer.

(21) Appl. No.: 17/124,508

(22) Filed: Dec. 17, 2020

(65) Prior Publication Data

US 2021/0199490 A1 Jul. 1, 2021

(30) Foreign Application Priority Data

Dec. 30, 2019 (EP) ..................................... 19220146

(51) Int. Cl.
*G01G 19/414* (2006.01)
*G01G 19/52* (2006.01)
(Continued)

(52) U.S. Cl.
CPC .......... *G01G 19/52* (2013.01); *A47B 96/061* (2013.01); *G01G 19/414* (2013.01); *G01G 21/23* (2013.01);
(Continued)

(58) Field of Classification Search
CPC ...... G01G 19/414; G01G 21/18; G01G 23/01; G01G 21/23; G01G 19/52; A47F 10/02;
(Continued)

(56) References Cited

U.S. PATENT DOCUMENTS 4,396,079 A * 8/1983 Brendel ................. G01G 21/23
177/180
4,655,305 A 4/1987 Jacobson
(Continued)

FOREIGN PATENT DOCUMENTS

| CN | 110169685 A | 8/2019 |
|---|---|---|
| DE | 3733961 A1 | 4/1989 |

(Continued)

OTHER PUBLICATIONS

"Load Cells" by Industral Quick Search, accessed on Sep. 27, 2022 (https://www.iqsdirectory.com/articles/load-cell.html).*

*Primary Examiner* — Randy W Gibson
(74) *Attorney, Agent, or Firm* — Leydig, Voit & Mayer, Ltd.

(57) ABSTRACT

A shelf bracket assembly is mounted on a vertically disposed shelf upright, and has: at least one weighing device; an anchoring device; and a cantilever for supporting a shelf panel. In a condition where the shelf bracket assembly is mounted on the shelf upright, the cantilever projects from the shelf upright in a substantially horizontal direction. The cantilever has a vertically disposed metal plate. In a Cartesian coordinate system, an extent of the cantilever in a horizontal plane defines a Y-direction, a vertical direction defines a Z-direction, and a direction perpendicular to the Y-direction and the Z-direction defines an X-direction. The at least one weighing device includes: a force-introduction section; a linkage section; and a force-supporting section. The linkage section comprises two weighing plates extending horizontally and parallel to each other. The force-supporting section and the force-introduction section are at least partially formed of vertically extending metal plates.

17 Claims, 12 Drawing Sheets

(51) Int. Cl.
*G01G 21/23* (2006.01)
*A47B 57/40* (2006.01)
*A47F 10/02* (2006.01)
*A47F 5/00* (2006.01)
*A47B 96/06* (2006.01)
*G01G 21/28* (2006.01)

(52) U.S. Cl.
CPC ............ *A47B 57/40* (2013.01); *A47F 5/0018* (2013.01); *A47F 5/0043* (2013.01); *A47F 10/02* (2013.01); *A47F 2010/025* (2013.01); *G01G 21/28* (2013.01)

(58) Field of Classification Search
CPC ................. A47F 5/0018; A47F 5/0043; A47F 2010/025; G01M 1/22; A47B 96/061; A47B 57/40
See application file for complete search history.

(56) References Cited

U.S. PATENT DOCUMENTS

| | | | |
|---|---|---|---|
| 5,293,007 A | 3/1994 | Darst et al. | |
| 5,440,077 A | 8/1995 | Konishi et al. | |
| 5,510,581 A | 4/1996 | Angel | |
| 5,623,128 A * | 4/1997 | Grimm | G01G 3/18 177/229 |
| 5,723,826 A * | 3/1998 | Kitagawa | G01G 3/147 177/229 |
| 6,215,078 B1 * | 4/2001 | Torres | G01G 19/4144 235/383 |
| 6,318,184 B1 | 11/2001 | Kimerer, Jr. | |
| 6,817,255 B2 | 11/2004 | Aque et al. | |
| 7,690,270 B1 | 4/2010 | Park | |
| 8,153,913 B2 | 4/2012 | Haefeli et al. | |
| 8,186,232 B2 | 5/2012 | McDearmon et al. | |
| 10,121,121 B1 | 11/2018 | De Bonet et al. | |
| 10,198,710 B1 * | 2/2019 | Hahn | G01G 19/4144 |
| 10,746,589 B1 | 8/2020 | Danenberg et al. | |
| 10,809,122 B1 * | 10/2020 | Danenberg | A47F 5/103 |
| 10,830,633 B2 | 11/2020 | Fiehn et al. | |
| 10,969,267 B1 | 4/2021 | Franklin et al. | |
| 11,125,607 B1 | 9/2021 | Justice et al. | |
| 2003/0047603 A1 | 3/2003 | Lustenberger et al. | |
| 2003/0131672 A1 | 7/2003 | Norling | |
| 2004/0060372 A1 | 4/2004 | Hopkins | |
| 2006/0070463 A1 | 4/2006 | Walker | |
| 2006/0117871 A1 | 6/2006 | Wilner | |
| 2014/0165745 A1 | 6/2014 | Pascucci et al. | |
| 2014/0291042 A1 | 10/2014 | Tsutaya et al. | |
| 2016/0003696 A1 | 1/2016 | Longman et al. | |
| 2021/0199490 A1 | 7/2021 | Fritsch et al. | |

FOREIGN PATENT DOCUMENTS

| | | |
|---|---|---|
| DE | 102008056715 A1 | 5/2010 |
| EP | 0251175 A2 | 1/1988 |
| EP | 1319173 B1 | 6/2003 |
| WO | WO 2019220400 A1 | 11/2019 |

* cited by examiner

SHELF BRACKET ASSEMBLY

CROSS-REFERENCE TO PRIOR APPLICATIONS

Priority is claimed to European Patent Application No. 19 220 146.5, filed on Dec. 30, 2019, the entire disclosure of which is hereby incorporated by reference herein.

FIELD

The present invention relates to a shelf bracket assembly having at least one weighing device. The shelf bracket assembly is capable of being mounted on a vertically disposed shelf upright.

BACKGROUND

EP1319173B1 shows a shelving unit of a small parts storage system where the item that is removed is determined in an automated manner. The shelving unit includes a weighing unit. The technical teaching of the patent concerns calculating the exact location of removal of an item based on the weight measured by the weighing scale. However, no consideration is given to the practical implementation of the load cell in the shelving unit.

SUMMARY

In an embodiment, the present invention provides a shelf bracket assembly that is mounted on a vertically disposed shelf upright, and has: at least one weighing device; an anchoring device; and a cantilever for supporting a shelf panel. In a condition where the shelf bracket assembly is mounted on the shelf upright, the cantilever projects from the shelf upright in a substantially horizontal direction. The cantilever comprises a vertically disposed metal plate. In a Cartesian coordinate system, an extent of the cantilever in a horizontal plane defines a Y-direction, a vertical direction defines a Z-direction, and a direction perpendicular to the Y-direction and the Z-direction defines an X-direction. The at least one weighing device includes: a force-introduction section; a linkage section; and a force-supporting section. The linkage section comprises two weighing plates extending horizontally and parallel to each other. The force-supporting section and the force-introduction section are at least partially formed of vertically extending metal plates.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
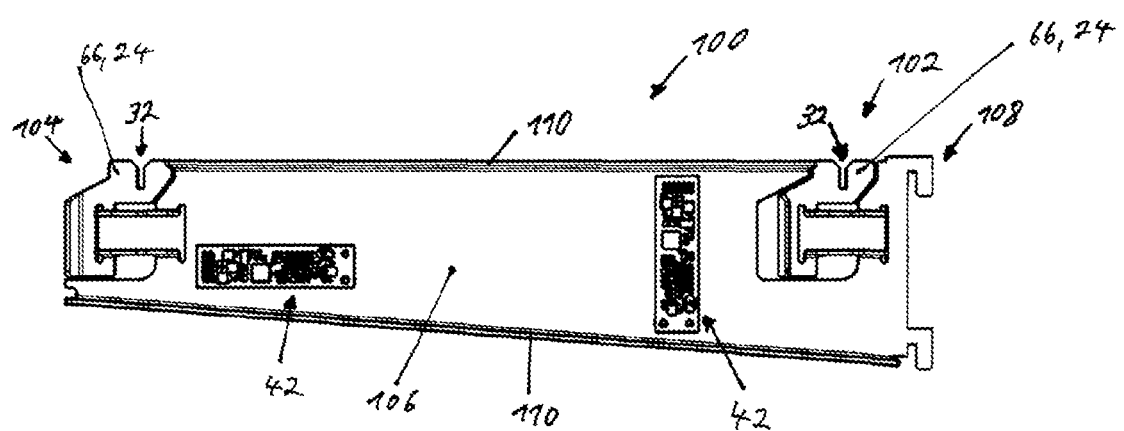
FIG. 1 shows a shelf bracket assembly with two weighing devices in a view looking at the inner side.

In an embodiment, the present invention provides a shelf bracket assembly and a shelving unit with integrated weighing functionality.

In accordance with the present invention, there is provided a shelf bracket assembly having at least one weighing device. The shelf bracket assembly is capable of being mounted on a vertically disposed shelf upright. For this purpose, the shelf bracket assembly includes an anchoring device. The shelf bracket assembly further includes a cantilever for supporting a shelf panel. In a condition where the shelf bracket assembly is mounted on a shelf upright, the cantilever projects from the shelf upright in a substantially horizontal direction. In an embodiment, the cantilever is formed by a vertically disposed metal plate. In a Cartesian coordinate system, the extent of the cantilever in the horizontal plane defines a Y-direction, the vertical direction defines a Z-direction, and the direction perpendicular to the Y- and Z-directions defines an X-direction. The at least one weighing device includes a force-introduction section, a linkage section, and a force-supporting section. The linkage section is formed by two weighing plates extending horizontally and parallel to each other. The force-supporting section and the force-introduction section are at least partially formed of vertically extending metal plates. In an embodiment, the force-supporting section, the linkage section, and the force-introduction section are integrally formed as a single piece.

In an embodiment, the vertical metal plate of the force-introduction section and/or of the force-supporting section extends laterally adjacent to the weighing plates in the X-direction. In other words, this means that, in a top view of the shelf bracket assembly, the force-introduction section and/or the force-supporting section extend(s) laterally of the weighing plates. Since the force-introduction section, the linkage section formed by the weighing plates, and the force-supporting section are mechanically connected and, in particular, integrally formed as a single piece, there is a mechanical connection between the force-introduction section and the force-supporting section. In an embodiment, the position "laterally adjacent to the weighing plates in the X-direction" is implemented and understood such that in a metal plate including the force-introduction section, the linkage section, and the force-supporting section, the weighing plates are bent 90°.

In an embodiment, the force-introduction section includes a receiving member for a cross bar of a shelf panel. The receiving member is located in the Z-direction above the position of the linkage section. That is, the Z-coordinates of the receiving member are greater than the Z-coordinates of the linkage section. The X-coordinates and the Y-coordinates of the receiving member and the linkage section are irrelevant in this connection. In an embodiment, the receiving member has a recess oriented downward in the vertical direction and adapted for insertion of a cross bar of a shelf panel. The receiving member is configured to support a cross bar of the shelf panel. In an embodiment, the cross bar is supported in a torque-free manner.

In an embodiment, the force-introduction section includes a stabilizing member. In an embodiment, the stabilizing member is the form of a metal plate oriented in the X-Z directions. In an embodiment, the stabilizing member is integrally formed in one piece with the force-introduction section.

In an embodiment, the metal plate of the force-supporting section, linkage section and of the force-introduction section is of uniform thickness. In an embodiment, the thickness of the metal plate is between 1.5 mm and 6 mm. In an embodiment, the thickness of the metal plate is between 2 mm and 3 mm.

In an embodiment, the two weighing plates are disposed one above the other in the Z-direction. The upper weighing plate has two strain gauges attached to the top side thereof. The lower weighing plate has two strain gauges attached to the bottom side thereof. The four strain gauges of the weighing device are interconnected to form a Wheatstone bridge. In an embodiment, the interconnection of the two strain gauges disposed on the top side of the upper weighing plate and the two strain gauges disposed on the top side of the upper weighing plate are provided on a strain gauge film. In an embodiment, the interconnection of the two strain gauges disposed on the bottom side of the lower weighing plate and the two strain gauges disposed on the bottom side of the lower weighing plate are provided on a strain gauge film.

In an embodiment, the two weighing plates are disposed one above the other in the Z-direction. The upper weighing plate has four strain gauges attached to the top side thereof. Two each of the four strain gauges are arranged adjacent to each other in the X-direction on the upper weighing plate. The four strain gauges of the weighing device are interconnected to form a Wheatstone bridge. In an embodiment, the interconnection of the four strain gauges and the four strain gauges are provided on a strain gauge film.

In an embodiment, the distance in the Z-direction between the two weighing plates is between 10 mm and 40 mm, in particular between 20 mm and 25 mm.

In an embodiment, the width of the weighing plates in the X-direction is narrowest in the central region of the linkage section. This should not be understood to mean that the narrowest point of the weighing plates is exactly in the middle of the weighing plates. Rather, this means that the width of the weighing plate decreases, starting at the mechanical contact of a weighing plate with the force-introduction section, and then increases toward the mechanical contact with the force-supporting section. Advantageously, the narrowest point is slightly off-center of the weighing plate. In an embodiment, the width contour of the upper weighing plate and the width contour of the lower weighing plate are similar but not exactly the same. However, the thickness of the upper weighing plate and the thickness of the lower weighing plate in the Z-direction are the same. Via the width contour of the weighing plates, the area moment of inertia of the weighing plates is adjusted so as to obtain a constant area moment of inertia in the region of the strain gauges and thereby obtain the best weighing results.

In an embodiment, the width of the weighing plates at the widest point is between 5 mm and 20 mm, in particular between 7 mm and 10 mm. In an embodiment, the width of the weighing plates at the narrowest point is between 50% and 80% of the width of the weighing plates at the widest point.

In an embodiment, the weighing device includes an overload stop, which is defined by the height of a gap between the cantilever and the force-introduction section. In an embodiment, there is provided a separately mounted overload stop.

In an embodiment, the shelf bracket assembly includes two weighing devices, the cantilever and the two weighing devices being integrally formed as a single piece. In an embodiment, the anchoring device is also integrally formed in one piece with the cantilever. That is, the cantilever, the anchoring device, and the two weighing devices are formed from one metal plate. This does not rule out that, in an embodiment, a separate cover for each weighing device and/or a separate cover for the inner region of the shelf bracket assembly may be mounted, in particular screwed, welded or riveted, to the cantilever to cover the weighing device at the outer or inner side.

In an embodiment, two weighing devices are formed separately and screwed or welded to the cantilever. In this case, the force-supporting section is flanged in the vertical direction to allow for a lateral offset for a mounting device, thus forming a stiffening rib. The mounting device is flanged from the stiffening rib, so that the mounting device is formed parallel to the force-introduction section and to the force-supporting section.

In accordance with the invention, there is provided a method for manufacturing a weighing device for a shelf bracket assembly. In such method, a blank for at least one weighing device is cut out from a metal plate using a metal-cutting laser. The blank is bent with a bending tool, so that at least one stabilizing member and, in particular, stiffening ribs are formed. The blank is bent with a bending tool, so that an upper weighing plate and a lower weighing plate are formed. A strain gauge film with at least two strain gauges is applied to the upper weighing plate. In an embodiment, a strain gauge film with at least two strain gauges is applied to the upper weighing plate, and a strain gauge film with at least two strain gauges is applied below the lower weighing plate. The strain gauge film is connected to at least one circuit board having electronics mounted thereon, in particular an analog-to-digital converter for processing at least one output signal from the at least one strain gauge film.

In an embodiment, the step of cutting out a blank for at least one weighing device from a metal plate using a metal-cutting laser includes the step of cutting out a blank for two weighing devices and a cantilever from a metal plate.

In an embodiment, a mounting side is created on the stiffening rib by bending the stiffening ribs with a bending tool. Using a drilling device, mounting holes are drilled into the mounting sides, and mounting holes are drilled into a cantilever of the shelf bracket assembly. The weighing device is connected to the cantilever of the shelf bracket assembly by means of the mounting holes and screws.

The invention also relates to a shelving unit formed by at least two vertically disposed shelf uprights and at least two inventive shelf bracket assemblies disposed at the same height, each on a respective one of the shelf uprights. The shelving unit further includes at least one shelf panel placed on the two shelf bracket assemblies disposed at the same height. The shelf panel includes two cross bars which are configured parallel to each other and supported at their ends on the force-introduction sections of two weighing devices, respectively. The shelving unit includes an evaluation unit which determines new center-of-mass coordinates from the data from the weighing devices, either at periodic intervals or upon a change in the total weight that is sensed by the four weighing devices on whose force-introduction sections the shelf panel rests. These center-of-mass coordinates are transmitted to a control unit. The control unit determines a shelf region on the shelf panel based on the change in the center-of-mass coordinates. The control unit determines, from the change in total weight, the weight of the pieces of merchandise removed from or added to the determined shelf region and updates the inventory stored in a memory for this shelf region.

In an embodiment, upon a change in total weight, the evaluation unit determines a vector between the previous center-of-mass coordinates and the new center-of-mass coordinates. The shelf region determined by the control unit is calculated by the control unit from the vector and the total weight.

In an embodiment, the evaluation unit tares all weighing devices periodically and simultaneously. The center-of-mass coordinates calculated from the data from the weighing devices represent the center of mass where something was removed from or added to the shelf panel. In an embodiment, in order to determine the new center-of-mass coordinates, the evaluation unit calculates, for each weighing device, the difference between a new weight value and a previous weight value. That is, when a product is removed from or added to the shelf panel, the change in weight is determined at each weighing device separately. The new center-of-mass coordinates are calculated from the four differential values; that is, from the change in weight at each weighing device. Both embodiments provide for the weight values measured by the four weighing devices to be considered separately, rather than for calculating a vector that needs to be scaled. Thus, these two embodiments are less sensitive to tolerances during the determination of weight values by the weighing devices.

Figure 2:
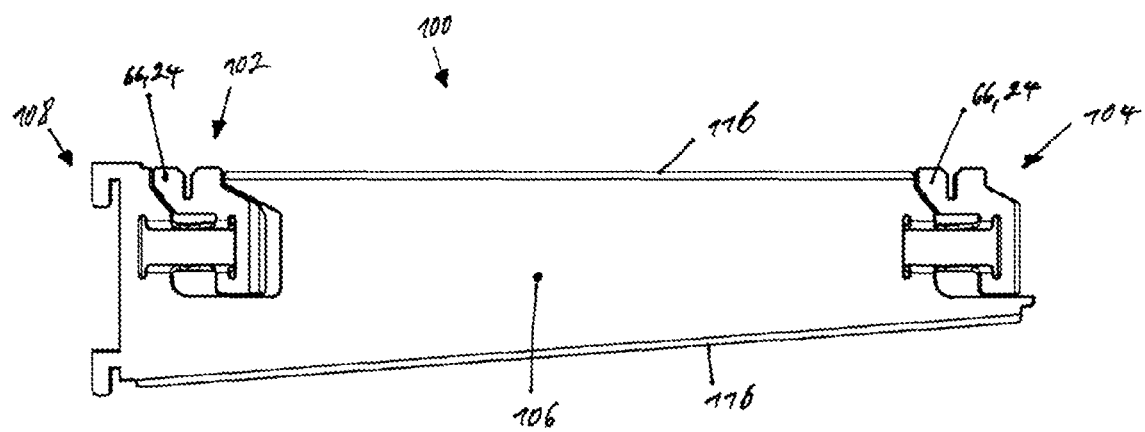
FIG. 2 shows a shelf bracket assembly with two weighing devices in a view looking at the outer side.

FIG. 1 shows a shelf bracket assembly 100 in a side view looking at the inner side, and FIG. 2 shows it in a side view looking at the outer side. Shelf bracket assembly 100 includes a cantilever 106 formed of a vertically disposed metal plate and extending in the horizontal direction. To increase stability, cantilever 106 is formed at its top and at its bottom with a stiffening rib 110. The stiffening rib is implemented by a 90° bend 116 of the metal plate. At one axial end of cantilever 106, shelf bracket assembly 100 includes an anchoring device 108 in the form of two hooks, by which the shelf bracket assembly can be mounted on a shelf upright. Shelf uprights are often configured as vertically mounted rails having slots arranged one above the other, so that the shelf bracket assemblies can be mounted at different heights on the shelf upright. Two bracket assemblies 100 mounted on two spaced-apart shelf uprights at the same height support a shelf panel, thus forming a shelf compartment. Cantilever 106 is triangular in shape; that is, the cantilever has a greater height in the region of anchoring device 108 than at the opposite axial end, which corresponds to the front region of the shelf compartment. The cantilever further includes two weighing devices 102, 104, one weighing device 102 being mounted in the region of anchoring device 108, and one weighing device 104 being mounted in the region of the other axial end of cantilever 106. Each weighing device 102, 104 includes a force-introduction section 24 having a receiving member 66 formed with a receptacle 32. Receptacle 32 allows a cross bar of a shelf panel to be inserted therein, so that force-introduction sections 24 of weighing devices 102, 104 support and hold the shelf panel via the cross bars. Receiving member 66 is freely accessible from above, so that the shelf panel is supported solely by force-introduction sections 24 of weighing devices 102, 104. In the side view looking at the inner side of the shelf bracket assembly 100 according to FIG. 1, there are shown two circuit boards 42, each being associated with each of weighing devices 102, 104 and having electronics mounted thereon, in particular an analog-to-digital converter for processing at least one output signal from a strain gauge of weighing devices 102, 104.

Figure 3:
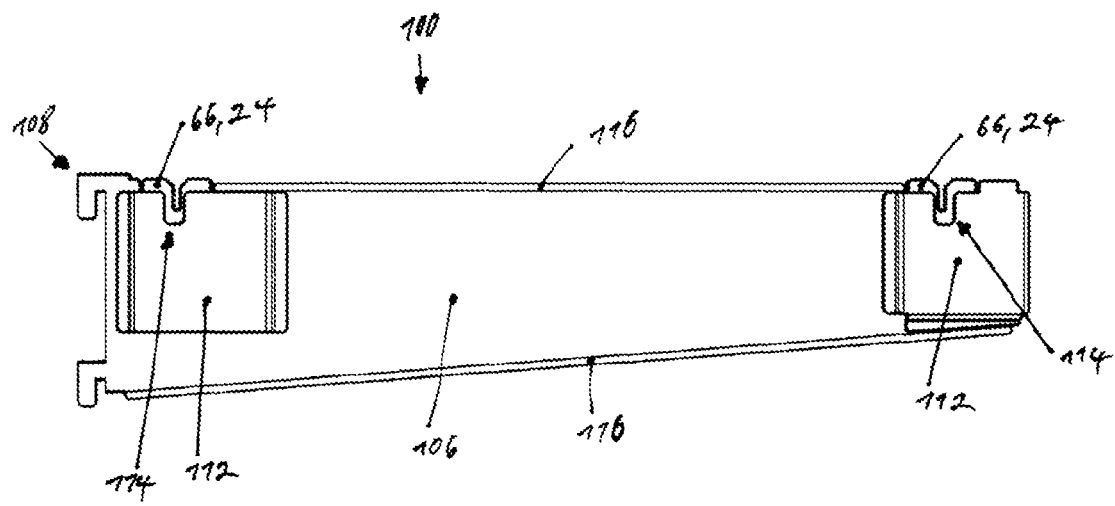
FIG. 3 shows a shelf bracket assembly with two weighing devices and a protective cover in a view looking at the outer side.

FIG. 3 shows a view looking at the outer side of the shelf bracket assembly, similar to FIG. 2, but where weighing devices 102, 104 are protected by a protective cover 112 from externally caused mechanical damage. Protective cover 112 has an opening 114 which prevents it from unintentionally supporting the cross bar to be weighed. Protective cover 112 is, for example, welded or screwed to cantilever 106 of shelf bracket assembly 100. The view of FIG. 3 depicts a shelf bracket assembly 100 such as is used to build a shelving unit. Weighing devices 102, 104 are shown in greater detail in the view of FIG. 2.

Figure 4:
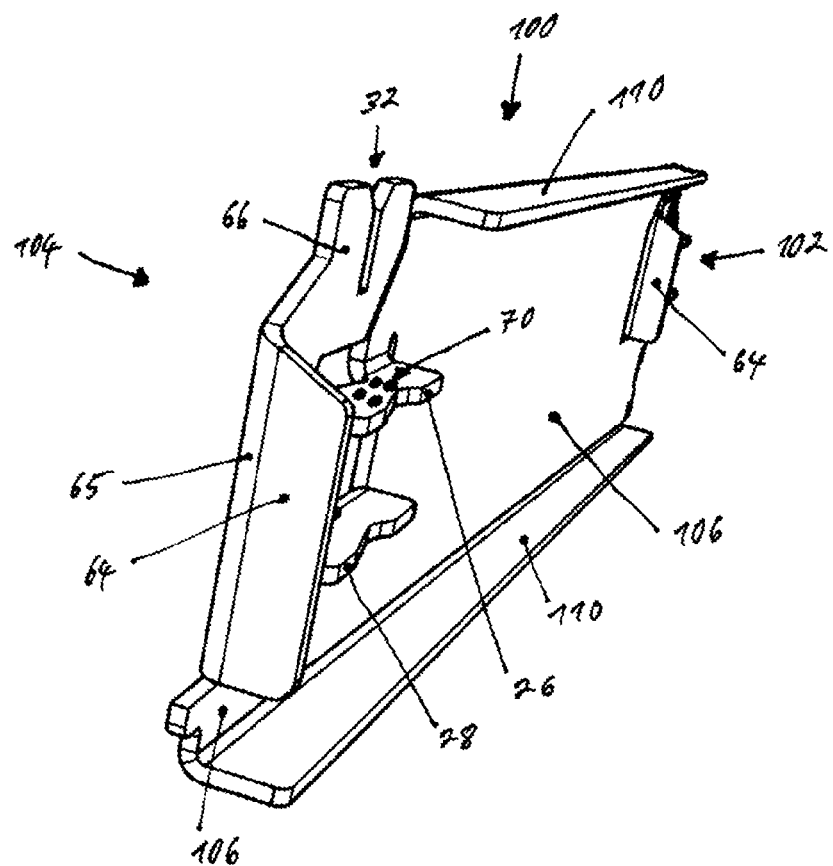
FIG. 4 shows a shelf bracket assembly with two weighing devices in an isometric view.

FIG. 4 shows a shelf bracket assembly 100 in an isometric view. Weighing device 104 at the front axial end, which will be described in more detail below, is integrally formed in one piece with cantilever 106 by bending the metal plate of cantilever 106. Weighing device 104 is constituted of a force-introduction section 24 including a receiving member 66 with a receptacle 32 for a cross bar of a shelf panel. Force-introduction section 24 further includes a stabilizing member 64 integrally formed in one piece with force-introduction section 24 and connected therewith by a bend 65. Two parallel weighing plates 26, 28 are also part of weighing device 104 and are integrally connected in one piece with the other parts. The manufacture and function of weighing plates 26, 28 will be described in more detail below. Upper weighing plate 26 includes four strain gauges 70 adapted to sense tensile or compressive movement of weighing plate 26. Located at the other axial end of the cantilever toward anchoring device 108 is the second weighing device 102, of which only stabilizing member 64 is clearly visible in FIG. 4.

An optional cover is attachable to stiffening ribs 110 and protects the inner region of shelf bracket assembly 100.

FIGS. 1 through 4 show a shelf bracket assembly 100 which, when viewed from the front, forms the left shelf bracket assembly of a shelf compartment. A shelf compartment must also include a right shelf bracket assembly, so that the shelf panel is supported on the left side by the left shelf bracket assembly and on the right by the right shelf bracket assembly. The right shelf bracket assembly is configured mirror-symmetrically to the left shelf bracket assembly.

Figure 5:
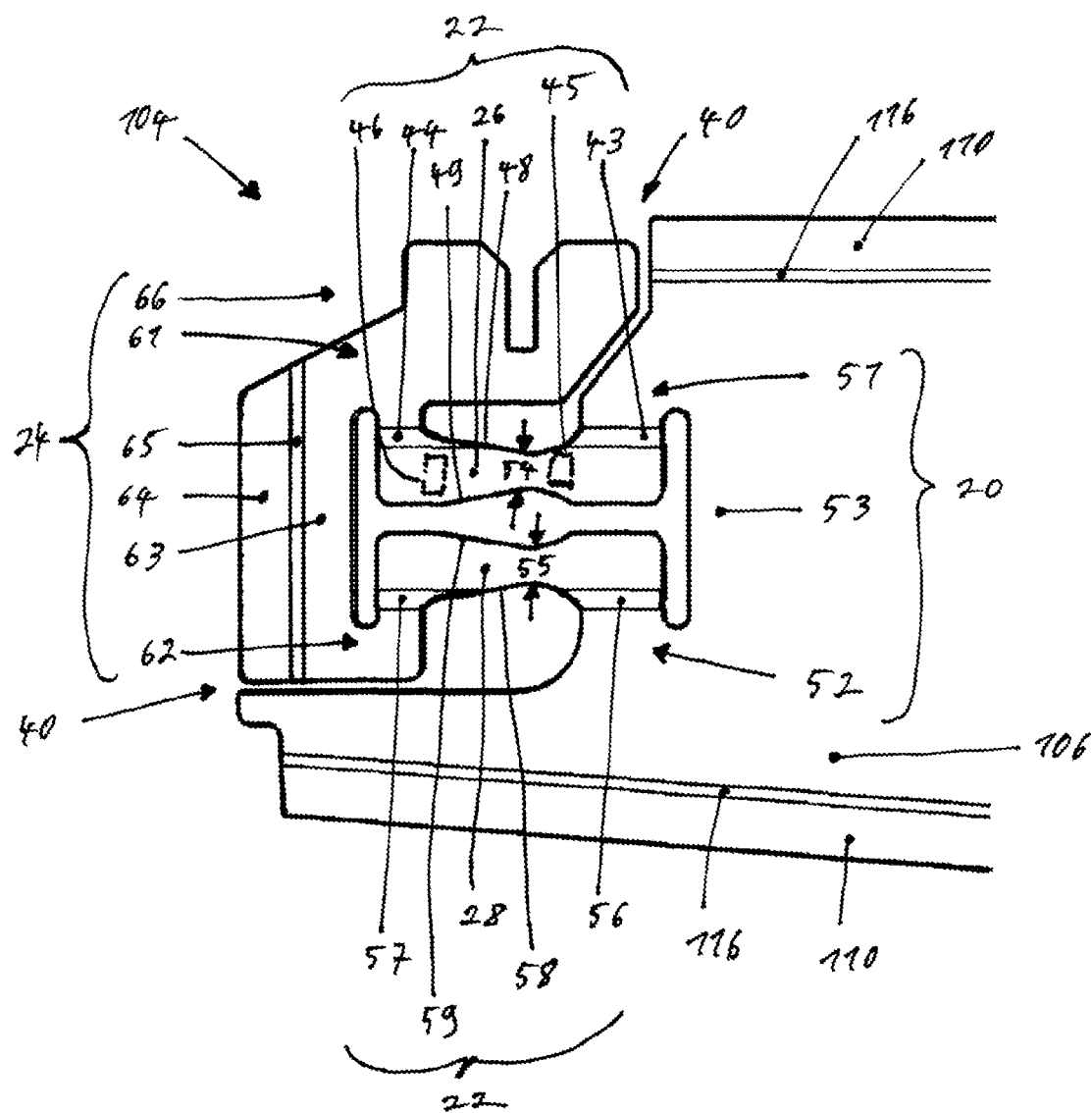
FIG. 5 shows a portion of a blank for a shelf bracket assembly after machining with a metal-cutting laser.
Figure 6:
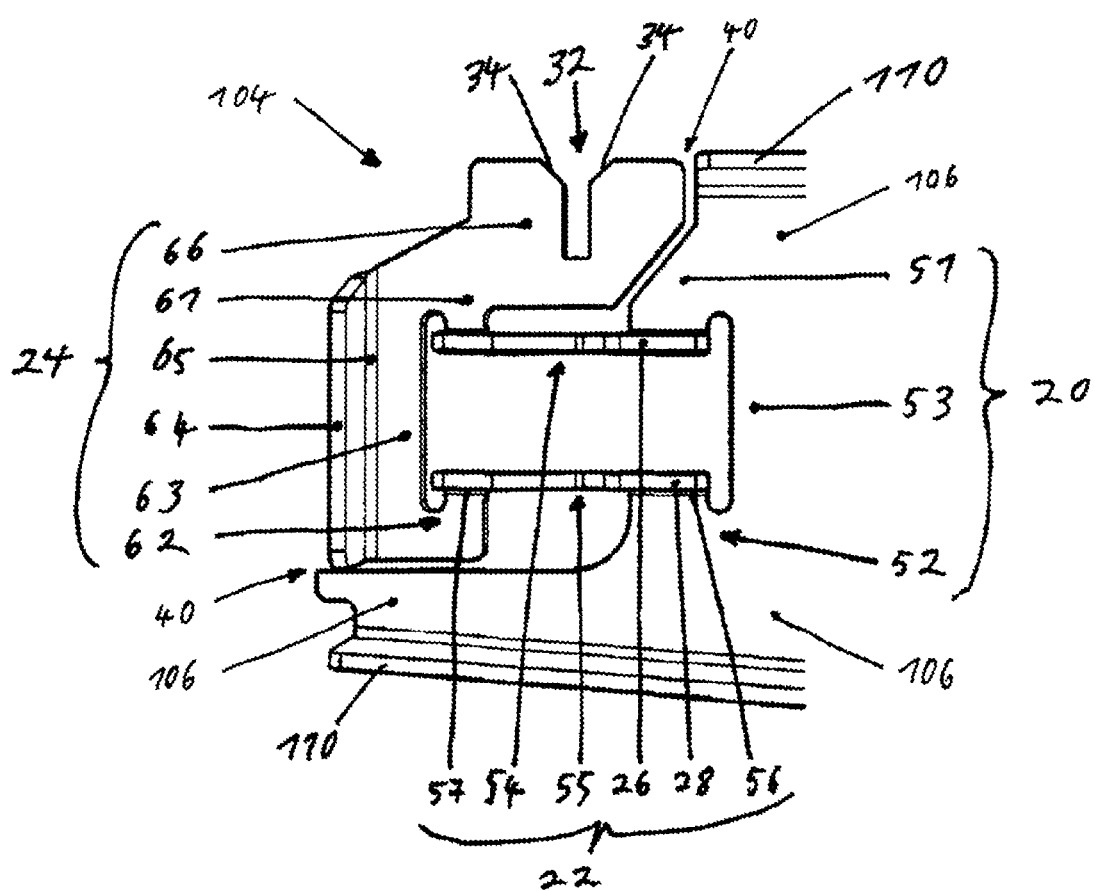
FIG. 6 shows a portion of a shelf bracket assembly with a weighing device.

FIGS. 5 and 6 show a detail of a weighing device 104. The representation is chosen to show a weighing device 104 at the front axial end of cantilever 106. The weighing device 102 at the axial end of cantilever 106 where anchoring device 108 is located is configured correspondingly. FIG. 5 shows a blank for a weighing device 104. The blank is fabricated from a metal plate having a thickness on the order of 2.5 mm. The blank is cut out as shown in FIG. 5 using a metalworking method, for example, using a metal-cutting laser. In order to obtain the weighing device 104 as shown in FIG. 6, stiffening ribs 110 of stabilizing member 64, as well as weighing plates 26, 28, are flanged; i.e. bent 90°. The weighing device is then equipped with strain gauges and connected to electronics. Weighing device 104 serves as a deformable body and includes a force-introduction section 24 into which a vertically acting force is introduced via a shelf-panel cross bar supported in a torque-free manner, and further includes a force-supporting section 20 mechanically rigidly connected to cantilever 106. A linkage section 22 is disposed in the line of force between force-introduction section 24 and force-supporting section 20. The deformable body deforms substantially in the region of linkage section 22. A weight force acting on weighing device 104 can be inferred from the deformation of the deformable body.

Linkage section 22 includes two weighing plates 26, 28, which are cut out from the metal plate as illustrated in FIG. 5. Upper weighing plate 26 is bent up 90° and lower weighing plate 28 is bent down 90° so that the two weighing plates 26, 28 are arranged parallel to each other and one above the other in the Z-direction (FIG. 6). Thus, the axially front and rear portions of each weighing plate 26, 28 are each connected to a respective one of bending portions 43, 44, 56, 57, by which the 90° change in direction is produced in the metal plate. After bending, the then top side of upper weighing plate 26 includes two regions 45, 46, in each of which are mounted two strain gauges. In this variant, four strain gauges are located on upper weighing plate 26. In a variant in which two strain gauges are located on upper weighing plate 26 and two strain gauges are located on lower weighing plate 28, the bottom side of lower weighing plate 28 also includes two regions intended for attachment of the strain gauges, and the regions on upper weighing plate 26 are each intended for only one strain gauge.

An axial end of upper weighing plate 26 is connected via a bending portion 43 to a holder 51 of force-supporting section 20. The other axial end of upper weighing plate 26 is connected via a bending portion 44 to a holder 61 of force-introduction section 24. An axial end of lower weighing plate 28 is connected via a bending portion 56 to a holder 52 of force-supporting section 20. The other axial end of lower weighing plate 28 is connected via a bending portion 57 to a holder 62 of force-introduction section 24. Width 54 of upper weighing plate 26 and width 55 of lower weighing plate 28 are narrower in the central region than at the axial ends. The shape of the width contours 48, 49 of upper weighing plate 26 and the shape of the width contours 58, 59 of lower weighing plate 28 are not identical. Moreover, these contours 48, 49, 58, 59 are not mirror-symmetric with respect to the center. Via these contours 48, 49, 58, 59, the area moments of inertia of weighing plates 26, 28 are adjusted so as to obtain an (ideally) constant area moment of inertia in the region of the strain gauges and thereby obtain the best weighing results. The thickness of weighing plates 26, 28 is the same everywhere, including this region, and corresponds to the thickness of the metal plate of the other parts of weighing devices 102, 104 and of cantilever 106.

Force-supporting section 20 includes a base 53 and the holder 51 which is connected to base 53 and to which is attached the bend 43 of upper weighing plate 26 of linkage section 22. Force-supporting section 20 further includes the holder 52 which is connected to base 53 and to which is attached the bend 56 of lower weighing plate 28 of linkage section 22.

Force-introduction section 24 includes a base 63 and the holder 61, which is connected to base 53 and to which is attached the bend 44 of upper weighing plate 26 of linkage section 22. Force-introduction section 24 further includes the holder 62, which is connected to base 53 and to which is attached the bend 57 of lower weighing plate 28 of linkage section 22. To allow a stabilizing member 64 to be flanged relative to base 63 of force-introduction section 24, force-introduction section 24 includes a bend 65 in this transition region. A receiving member 66 disposed vertically above linkage section 22 includes a recess 32 whose open end is widened by bevels 34. Recess 32 serves to support a cross bar of a shelf panel in a torque-free manner.

All elements shown in FIG. 5 lie in one plane. By flanging upper weighing plate 26, lower weighing plate 28, stabilizing member 64, and stiffening ribs 110, these parts are oriented perpendicular to the plane of the other parts in weighing devices 102, 104. A further result of this is that receiving member 66 is located laterally adjacent to upper weighing plate 26 and lower weighing plate 28 in the horizontal direction, particularly in the X-direction.

Figure 7:
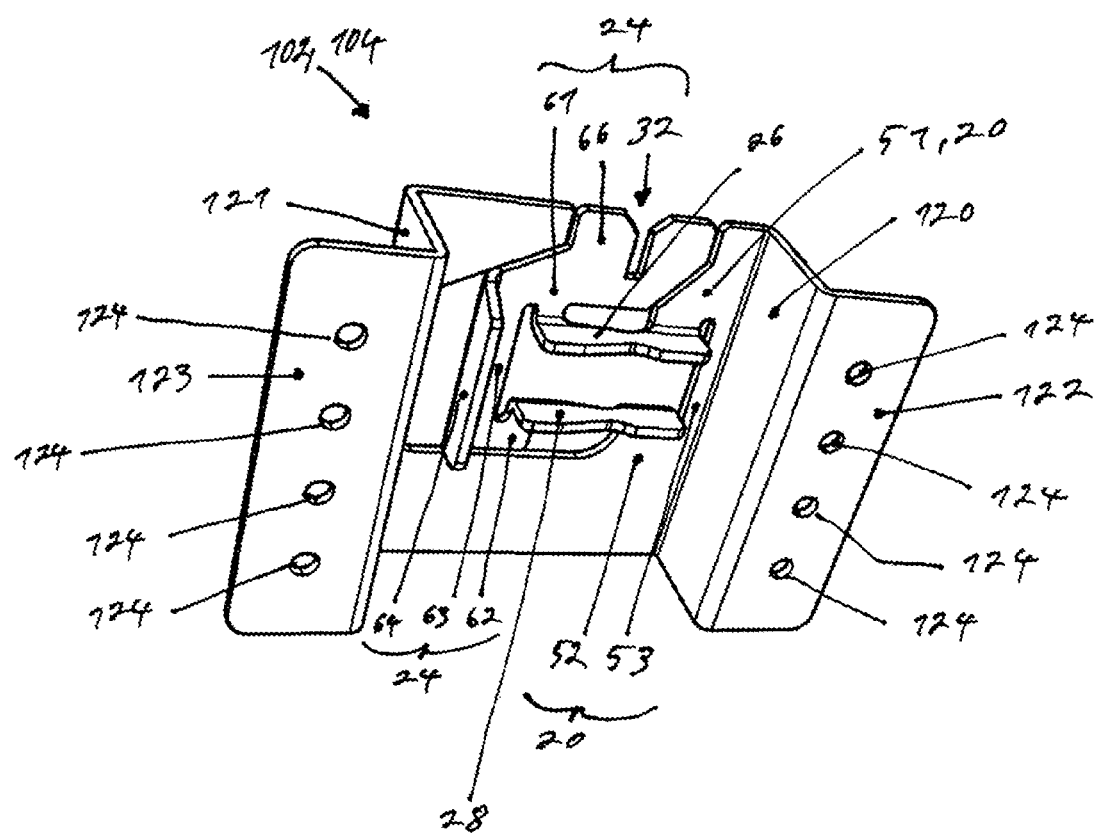
FIG. 7 shows a weighing device according to a second embodiment.

FIG. 7 shows a weighing device 102, 104 similar to that depicted in FIG. 6, but which is not integrated with the cantilever. Parts identical to those in FIG. 6 are not separately described again here. Weighing device 102, 104 is attached via its force-supporting section 20 to vertically extending stiffening ribs 120, 121. Two mounting plates 122, 123 having mounting holes 124 are flanged perpendicularly outwardly from stiffening ribs 120, 121. Thus, a weighing device may be formed as a separate weighing device, as described, and may, for example, be screwed to a wall in order to support, via its receiving member, a cross bar of a shelf panel or, in general, to support an item to be weighed.

Figure 8:
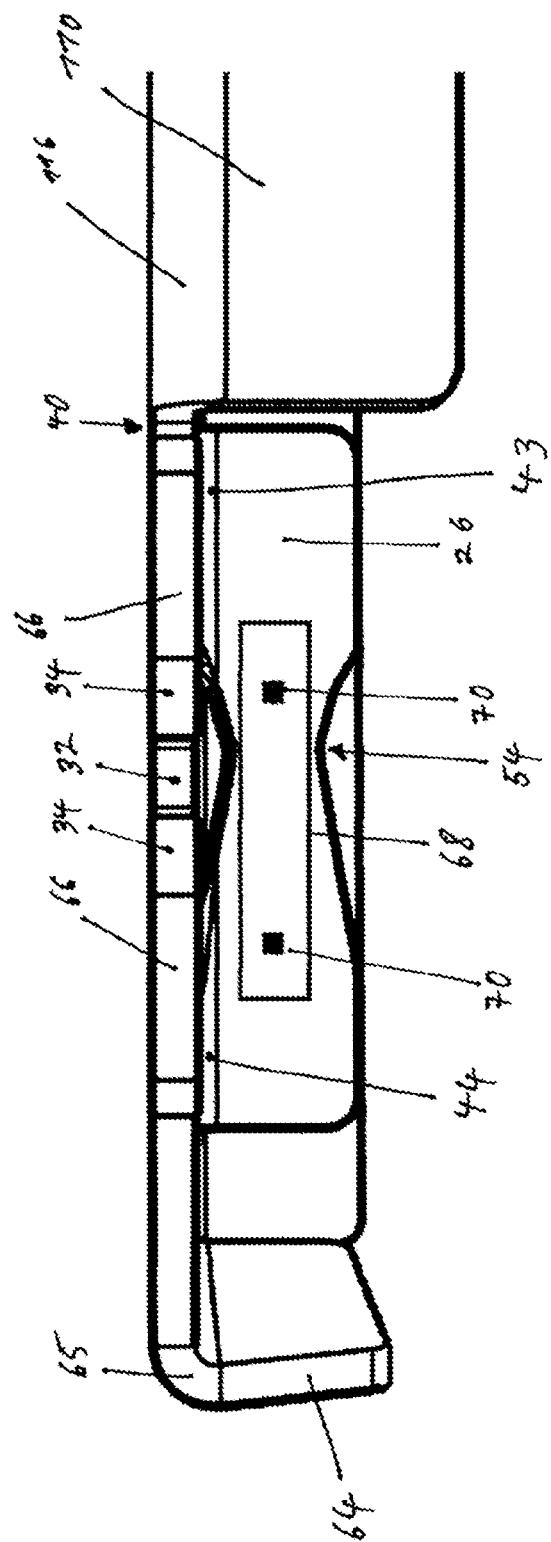
FIG. 8 shows a portion of a shelf bracket assembly with a weighing device with two strain gauges.

FIG. 8 shows a weighing device 104 from above. Upper weighing plate 26 has attached thereto a strain gauge film 68 including two strain gauges 70, which measure tensile and/or compressive deformation in the regions 45, 46 intended for this purpose on upper weighing plate 26. In this case, the bottom side of lower weighing plate 28 also has attached thereto two strain gauges with a strain gauge film. These four strain gauges 70 are interconnected to form a Wheatstone bridge (bridge circuit) and evaluated via circuit board 42.

Figure 9:
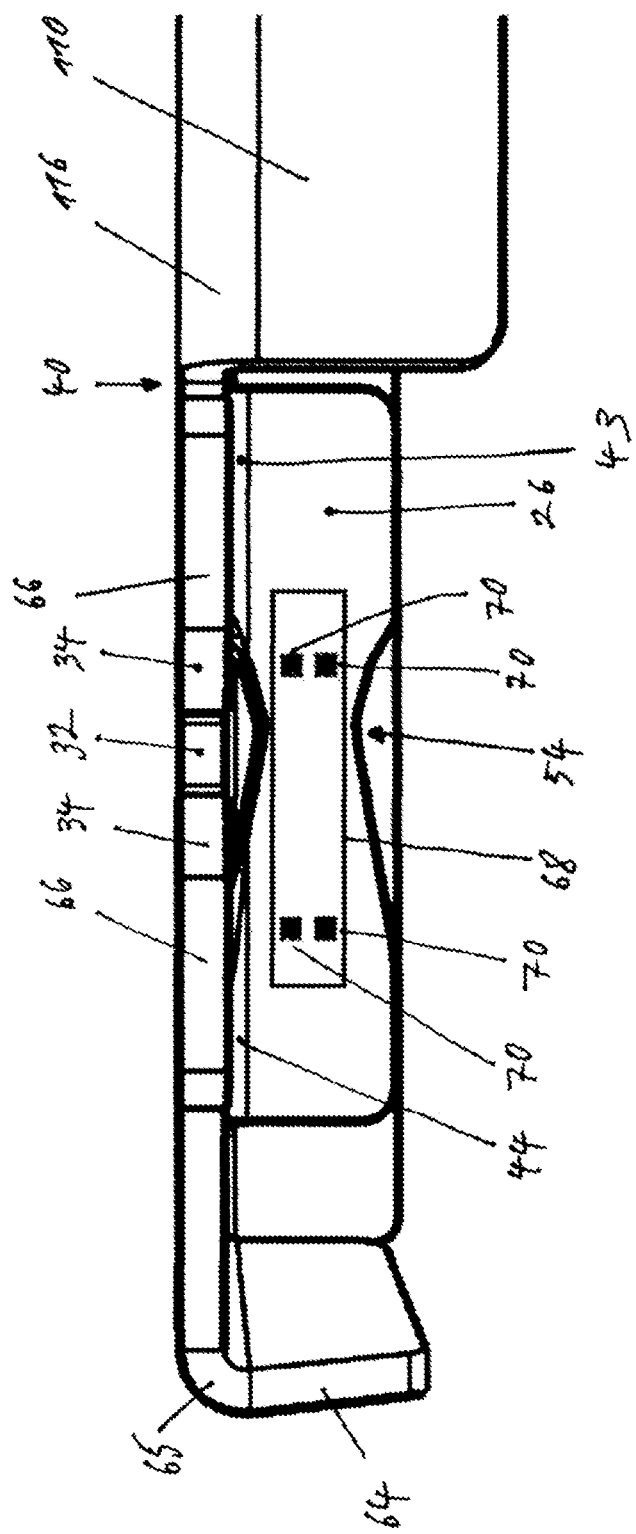
FIG. 9 shows a portion of a shelf bracket assembly with a weighing device with four strain gauges.

FIG. 9 shows a weighing device 104 from above. Upper weighing plate 26 has attached thereto a strain gauge film 68 including four strain gauges 70, which measure tensile and/or compressive deformation in the regions 45, 46 intended for this purpose on upper weighing plate 26. In each of the regions 45, 46 intended for attachment of strain gauges 70, two strain gauges 70 are mounted adjacent to each other. The four strain gauges 70 are interconnected to form a Wheatstone bridge (bridge circuit) and evaluated via circuit board 42.

Figure 10:
FIG. 10 illustrates a method for manufacturing a shelf bracket assembly.

FIG. 10 illustrates a method for manufacturing a shelf bracket assembly 100. In step 151, a blank of cantilever 106 and two weighing devices 102, 104 as well as anchoring device 108 are cut out from a metal plate using a metal-cutting laser. In step 152, stiffening ribs 110 of cantilever 106 as well as stabilizing members 64 of weighing devices 102, 104 are bent using a bending tool. In step 153, upper weighing plates 26 are bent up 90° and lower weighing plates 28 are bent down 90° using a bending tool. In step 154, strain gauge films 68 having four strain gauges 70 each are applied to upper weighing plates 26. In step 155, the strain gauge films 68 of the two weighing devices 102, 104 are connected to associated circuit boards 42 having electronics mounted thereon, in particular an analog-to-digital converter for processing at least one output signal from the strain gauge film 68 of weighing devices 102, 104.

Figure 11:
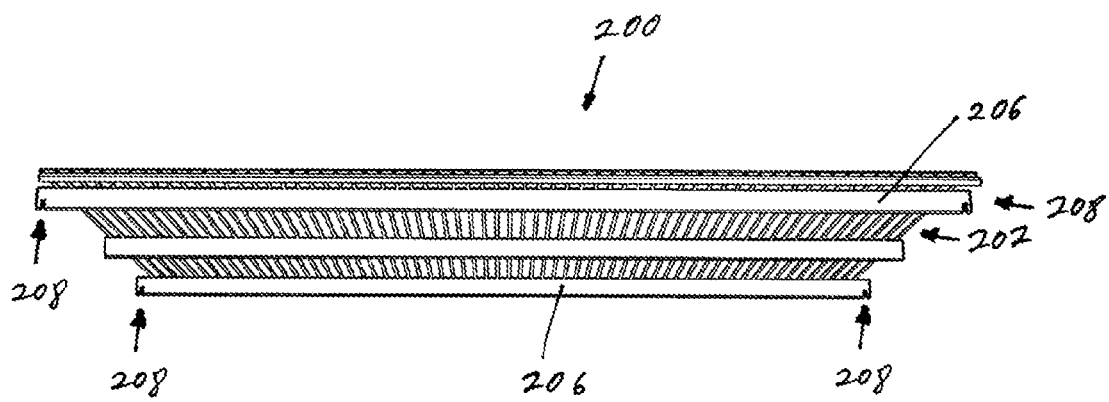
FIG. 11 shows a shelf panel.

FIG. 11 shows a shelf panel 200 in the form of a wire shelf panel. Shelf panel 200 includes a rigid mesh structure 202 on which items can be placed in the shelving unit. Mesh structure 202 is supported by at least two cross bars 206 extending transversely along shelf panel 200 and located in the front and rear regions of shelf panel 200. Cross bars 206 are formed at each of their ends with a notch 208 via which cross bars 206 can cooperate with receiving members 66 and the receptacles 32 thereof. Thus, the shelf panel can be inserted with notches 208 into receptacles 32 and is supported by receiving members 66 in a torque-free manner.

Figure 12:
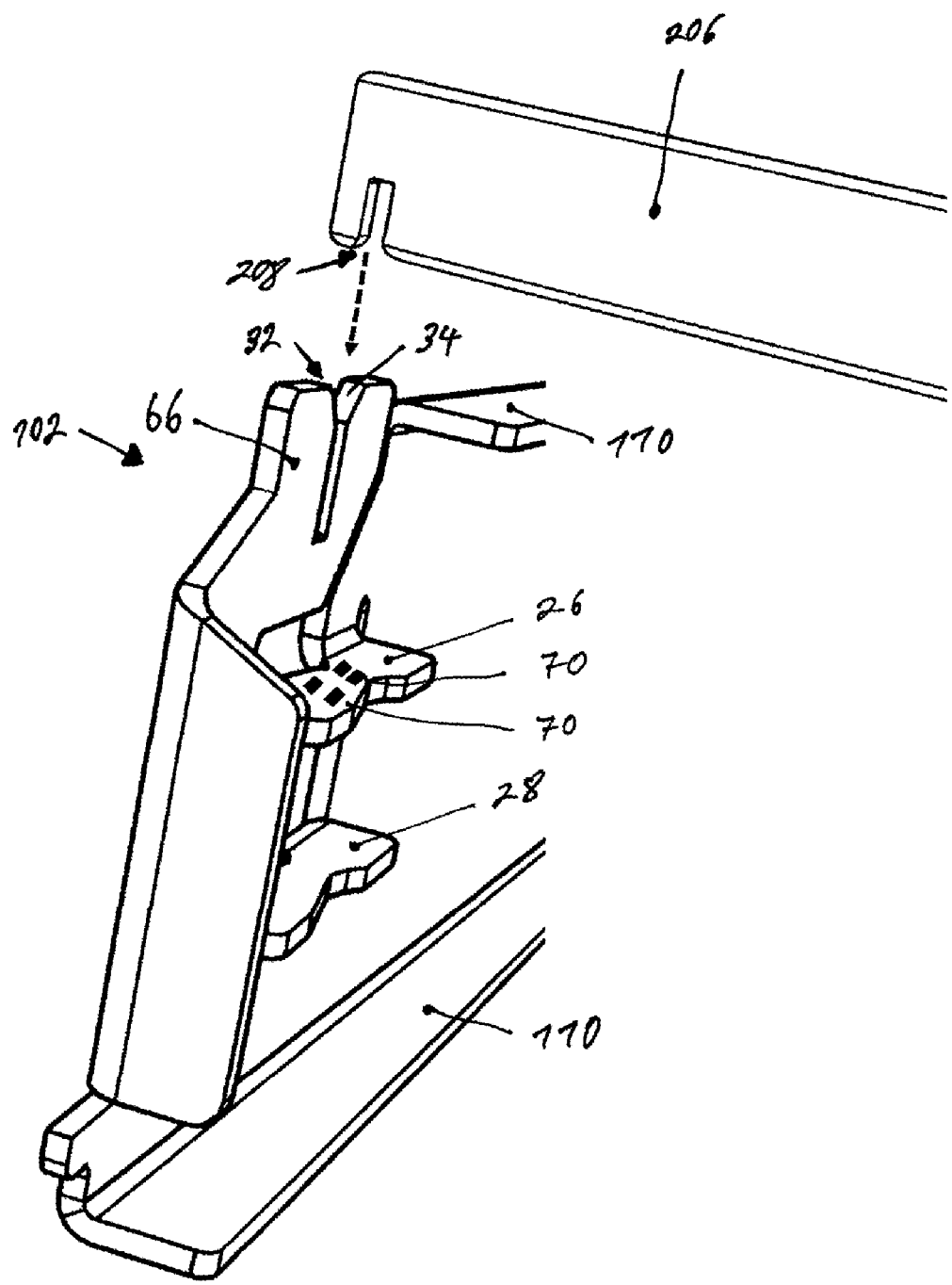
FIG. 12 shows an exploded view of a weighing device and a cross bar of a shelf panel.

FIG. 12 illustrates this cooperation between notch 208 of cross bar 206 and receptacle 32 of receiving member 66. Bevels 34 on receptacle 32 facilitate the insertion of cross bar 206 into receptacle 32.

Figure 13:
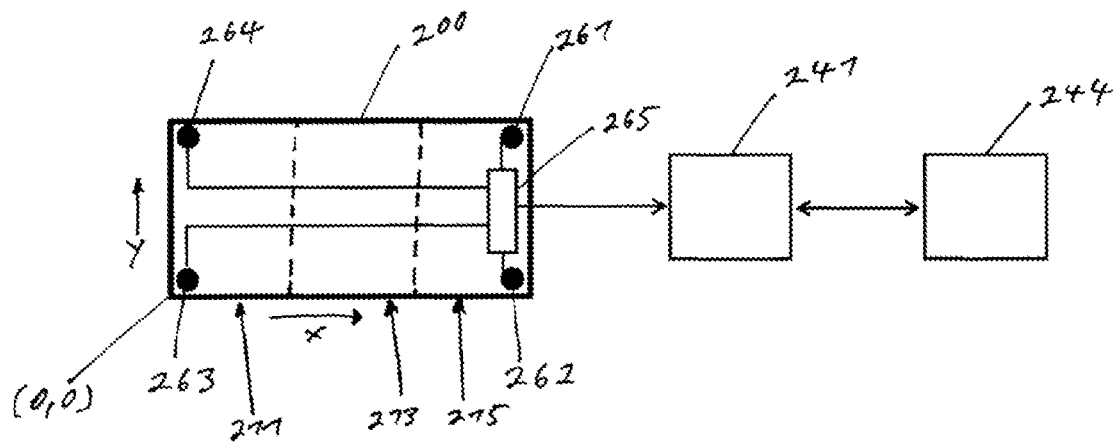
FIG. 13 shows a block diagram of a shelving unit.

FIG. 13 schematically shows three shelf regions 211, 213, 215 on a shelf panel 200, and corresponding components for inventory monitoring. The determination of the shelf region 211, 213, 215 where a product was removed from or added to shelf panel 200 is accomplished through center-of-mass determination of shelf panel 200.

Shelf panel 200 is floatingly supported by the four weighing devices 261, 262, 263, 264. These are the weighing devices 102, 104, which are integrated with shelf bracket assemblies 100. Shelf panel 200 is supported by a shelf bracket assembly 100 on the left of shelf panel 200 and a shelf bracket assembly 100 on the right of shelf panel 200. Shelf panel 200 is supported at the ends of its cross bars 206 by weighing devices 261, 262, 263, 264 via their force-introduction sections 24. Weighing devices 261, 262, 263, 264 determine, independently of one another, a weight force exerted by shelf panel 200 and the products placed in shelf regions 211, 213, 215. Individual weight forces, each equivalent to a portion of the total weight, act on respective ones of weighing devices 261, 262, 263, 264. The data from weighing devices 261, 262, 263, 264 are transmitted to an evaluation unit 265. The evaluation unit determines center-of-mass coordinates of shelf panel 200 from the individual weight data from weighing devices 261, 262, 263, 264. The coordinates in shelf regions 211, 213, 215 start in a corner at weighing device 263 with the coordinates (0, 0) and increase in horizontal direction X and in vertical direction Y.

To illustrate the center-of-mass determination, weighing devices 261, 262, 263, 264 are associated with corresponding weight data W261, W262, W263, W264 as illustrated in FIG. 13.

The determination of the center of mass in the X direction is as follows:

$$(W261+W262)/(W261+W262+W263+W264)$$

The determination of the center of mass in the Y direction is as follows:

$$(W261+W264)/(W261+W262+W263+W264)$$

Using a suitable scale factor that accounts for the size of shelf panel 200, it is possible to determine coordinates in shelf region 211, 213, 215 which correspond to the center-of-mass coordinates of shelf panel 200. These coordinates are determined in evaluation unit 265 based on the data from weighing devices 261, 262, 263, 264. Furthermore, evaluation unit 265 calculates a total weight W261+W262+W263+W264. The center-of-mass coordinates and the total weight are transmitted by evaluation unit 265 to a control unit 241. The shelving unit includes a memory 244 in which is stored an association between center-of-mass coordinates and shelf regions 211, 213, 215. Memory 244 further has stored therein, for each shelf region 211, 213, 215, the average weight of a piece of merchandise in this shelf region 211, 213, 215. Memory 244 has stored therein, for each shelf region 211, 213, 215, the current inventory; i.e., the current number of pieces of merchandise in this shelf region 211, 213, 215. This configuration can be used not only to measure the shelf regions 211, 213, 215 shown in FIG. 13, which are arranged side-by-side in the X direction, but also to measure shelf regions which are arranged in rows and columns in the X and Y directions; i.e., in a matrix.

Figure 14:
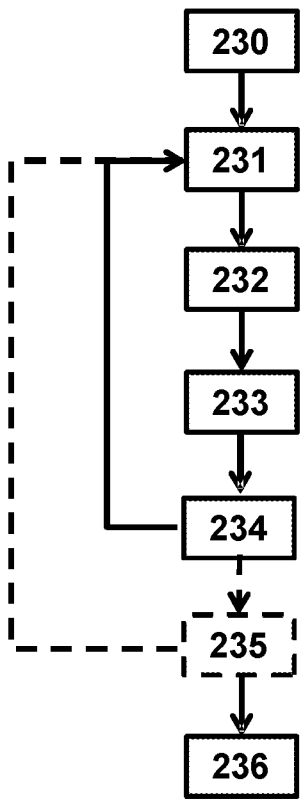
FIG. 14 illustrates a method for operating a shelving unit.

FIG. 14 shows a method for monitoring the inventory in a shelving unit, the method being executed by a control unit 241. In step 230, shelf regions 211, 213, 215 of shelf panel 200 are stocked with merchandise. In memory 244, each shelf region 211, 213, 215 is associated with the merchandise, and a weight per piece is stored therein. This is the average weight per piece, since the weight of bakery products, for example, may vary slightly. However, the variations are within a range and statistically distributed such that they are irrelevant to the method. In addition, memory 244 has stored therein, for each shelf region 211, 213, 215, the number of pieces of merchandise that are located on shelf panel 200 after the shelf is stocked. Also stored in memory 244 are the X and Y coordinates of each shelf region 211, 213, 215. Since the X and Y coordinates do not change, they do not need to be stored again each time the shelf is stocked. However, if the size of the shelf regions 211, 213, 215 and their arrangement are changed by rearranging the shelf dividers, then the association between X and Y coordinates and shelf regions 211, 213, 215 must be updated in memory 244. Thus, memory 244 has stored therein, for each shelf region 211, 213, 215, the range of X and Y coordinates over which the respective shelf region extends. Furthermore, memory 244 has stored therein, for each shelf region 211, 213, 215, a threshold value which, when no longer met, is intended to cause the shelf unit to output a message indicating that the respective shelf region 211, 213, 215 needs to be replenished with merchandise. In step 231, an evaluation unit 265 determines, from the weight values from weighing devices 261, 262, 263, 264, a location where one or more pieces of merchandise were removed or added, and also determines the total weight of the removed or added merchandise. The determination in step 231 may be performed using three alternative methods, which will be described below with reference to FIG. 15 through FIG. 17. In step 232, based on the coordinates of the location where something was removed or added and using the information stored in memory 244 about the arrangement of shelf regions 211, 213, 215, control unit 241 determines the respective shelf region 211, 213, 215. In step 233, the number of pieces of merchandise that were removed from or added to shelf region 211, 213, 215 is determined from the determined total weight of the removed merchandise and the weight value of a piece of merchandise associated with shelf region 211, 213, 215 in memory 244. Thus, the number of removed items is determined. In step 234, the current inventory associated with shelf region 211, 213, 215 is reduced by the number of removed pieces of merchandise or increased, as the case may be. The method is then continued with step 231, in which additional merchandise is removed or added. If a threshold value stored in memory 244 for the inventory in a shelf region 211, 213, 215 is no longer met, then, in step 235, the method sends a message to an operator informing the operator that the inventory has reached a low level and needs to be replenished. In step 236, the operator enters new inventory information after stocking a shelf region 211, 213, 215 with new merchandise. The information stored in memory 244 about the inventory in this shelf region 211, 213, 215 is then correspondingly updated in response to the operator input.

Figure 15:
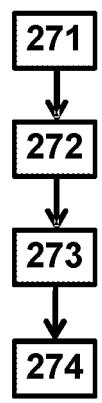
FIG. 15 illustrates a first method for determining a location on the shelf panel where a product was removed or added.

FIG. 15 schematically illustrates a first method for determining a location on shelf panel 200 where merchandise was removed or added. In step 271, all weighing devices 261, 262, 263, 264 are tared; that is, shelf panel 200 and all the merchandise placed thereon are treated as if they were a preload for weighing devices 261, 262, 263, 264 and set to zero. In step 272, a new weight value is measured by at least one weighing device 261, 262, 263, 264 and received by evaluation unit 265. In step 273, evaluation unit 265 calculates center-of-mass coordinates based on the current weight data from weighing devices 261, 262, 263, 264. These center-of-mass coordinates do not reflect the center of mass of shelf panel 200, but rather the center of mass of the change in weight in the coordinate system of shelf panel 200. This is the location where merchandise was removed from or added to shelf panel 200. In step 274, this location and the change in weight are transmitted to control unit 241.

Figure 16:
FIG. 16 illustrates a second method for determining a location on the shelf panel where a product was removed or added.

FIG. 16 schematically illustrates a second method for determining a location on shelf panel 200 where merchandise was removed or added. In step 281, center-of-mass coordinates are determined for the current center of mass of shelf panel 200 including all the merchandise placed thereon. This is the real center of mass. Shelf panel 200, or at least the merchandise placed thereon, is not tared. In step 282, a new weight value is measured by at least one weighing device 261, 262, 263, 264 and received by evaluation unit 265. In step 283, evaluation unit 265 determines new center-of-mass coordinates based on the new data from weighing devices 261, 262, 263, 264. In step 284, a vector reflecting the shift in the center-of-mass coordinates is calculated from the previous center-of-mass coordinates and the new center-of-mass coordinates. Starting from the previous center of mass, the vector leads to the new center of mass, unless it is scaled. Then, in step 285, the vector is scaled using the total weight of the shelf panel and the change in total weight. In step 286, the location where a product was removed from or added to shelf panel 200 is determined by adding the scaled vector to the previous center-of-mass coordinates. In step 287, this location and the change in weight are transmitted to control unit 241.

Figure 17:
FIG. 17 illustrates a third method for determining a location on the shelf panel where a product was removed or added.

FIG. 17 schematically illustrates a third method for determining a location on shelf panel 200 where merchandise was removed or added. In step 291, each of the weighing devices 261, 262, 263, 264 determines a respective weight value, the previous weight value. In step 292, a new weight value is measured by at least one weighing device 261, 262, 263, 264 and received by evaluation unit 265. In step 293, evaluation unit 265 calculates, for each weighing device 261, 262, 263, 264 separately, the change in the weight value; i.e., the evaluation unit calculates the difference between the new weight value and the previous weight value. In step 294, evaluation unit 265 calculates the center-of-mass coordinates of the differential values of the four weighing devices 261, 262, 263, 264. These center-of-mass coordinates do not reflect the center of mass of shelf panel 200, but rather the center of mass of the change in weight in the coordinate system of shelf panel 200. This is the location where merchandise was removed from or added to shelf panel 200. In step 295, this location and the change in weight are transmitted to control unit 241.

The functions of various elements shown in the drawings, including the functional blocks, may be realized by dedicated hardware or by generic hardware capable of executing software in conjunction with the corresponding software. If the functions are provided by means of a processor, they may be provided by a single dedicated processor, a single shared processor, or a plurality of generic processors which may in turn be shared. The functions may be provided, without limitation, by a digital signal processor (DSP), network processor, application-specific integrated circuit (ASIC), field programmable gate array (FPGA), read-only memory (ROM) with stored software, random access memory (RAM), and nonvolatile memories.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A shelf bracket assembly capable of being mounted on a vertically disposed shelf upright the shelf bracket assembly comprising:
   at least one weighing device;
   an anchoring device; and
   a cantilever for supporting a shelf panel,
   wherein, in a condition where the shelf bracket assembly is mounted on the shelf upright, the cantilever projects from the shelf upright in a substantially horizontal direction,
   wherein the cantilever comprises a vertically disposed metal plate,
   wherein in a Cartesian coordinate system, an extent of the cantilever in a horizontal plane defines a Y-direction, a vertical direction defines a Z-direction, and a direction perpendicular to the Y-direction and the Z-direction defines an X-direction,
wherein the at least one weighing device comprises:
a force-introduction section;
a linkage section; and
a force-supporting section,
wherein the linkage section comprises two weighing plates extending horizontally and parallel to each other,
wherein the force-supporting section and the force-introduction section are at least partially formed of vertically extending metal plates,
wherein the shelf bracket assembly comprises two weighing devices, comprising the at least one weighing device, and the cantilever and the two weighing devices are integrally formed as a single piece.

2. The shelf bracket assembly as recited in claim 1, wherein the force-supporting section, the linkage section, and the force-introduction section are integrally formed as a single piece.

3. The shelf bracket assembly as recited in claim 1, wherein the vertical metal plate of the force-introduction section or of the force-supporting section extends laterally adjacent to the weighing plates in the X-direction.

4. The shelf bracket assembly as recited in claim 1, wherein the force-introduction section comprises a receiving member for a cross bar of a shelf panel, the receiving member being located in the Z-direction above a position of the linkage section.

5. The shelf bracket assembly as recited in claim 1, wherein the force-introduction section comprises a stabilizing member, the stabilizing member being in the form of a metal plate oriented in the X-direction and the Z direction.

6. The shelf bracket assembly as recited in claim 1,
wherein the metal plate of each of the force-supporting section, of the linkage section, and of the force-introduction section is of a uniform thickness.

7. The shelf bracket assembly as recited in claim 1,
wherein the two weighing plates are disposed one above the other in the Z-direction, providing an upper weighing plate and a lower weighing plate,
wherein the weighing device comprises four strain gauges, which comprise the two weighing devices,
wherein the upper weighing plate has two strain gauges, of the four strain gauges, attached to a top side thereof,
wherein the lower weighing plate has two strain gauges, of the four strain gauges, attached to a bottom side thereof,
wherein the four strain gauges of the weighing device are interconnected to form a Wheatstone bridge.

8. The shelf bracket assembly as recited in claim 1,
wherein the two weighing plates are disposed one above the other in the Z-direction, providing an upper weighing plate and a lower weighing plate, and
wherein the upper weighing plate has four strain gauges attached to a top side thereof, two each of which are arranged adjacent to each other in the X-direction on the upper weighing plate, the four strain gauges of the weighing device being interconnected to form a Wheatstone bridge.

9. The shelf bracket assembly as recited in claim 1, wherein a width of the weighing plates in the X-direction is narrowest in a central region of the linkage section and increases toward the force-introduction section and toward the force-supporting section.

10. The shelf bracket assembly as recited in claim 1, wherein the weighing device comprises an overload stop, which is defined by a height of a gap between the cantilever and the force-introduction section.

11. A shelving unit comprising:
at least two vertically disposed shelf uprights, comprising the vertically disposed shelf upright;
at least two shelf bracket assemblies, comprising the shelf bracket assembly according to claim 1, each of which are disposed at a same height, each on a respective one of the shelf uprights, the at least two shelf bracket assembly together comprising four weighing devices, which comprises the two weighing devices of each of the at least two self bracket assemblies;
at least one shelf panel placed on the two shelf bracket assemblies disposed at a same height, the shelf panel comprising two cross bars, which are configured parallel to each other and supported at their ends on the force-introduction sections of the two weighing devices, respectively;
an evaluation unit that is configured to determine new center-of-mass coordinates from data from the weighing devices, either at periodic intervals or upon a change in a total weight that is sensed by the four weighing devices on whose force-introduction sections the shelf panel rests, and which transmits the coordinates to a control unit, the control unit configured to determine a shelf region based on changes in the center-of-mass coordinates, the control unit configured to determine, from a change in total weight, a weight of pieces of merchandise removed from or added to the determined shelf region, and to update an inventory stored in a memory for the shelf region.

12. The shelving unit as recited in claim 11, wherein upon a change in the total weight, the evaluation unit is configured to determine a vector between previous center-of-mass coordinates and the new center-of-mass coordinates, and the shelf region determined by the control unit is calculated by the control unit from the vector and the total weight.

13. The shelving unit as recited in claim 11, wherein the evaluation unit is configured to tare all of the weighing devices periodically and simultaneously.

14. The shelving unit as recited in claim 11, wherein in order to determine the new center-of-mass coordinates, the evaluation unit is configured to calculate, for each of the weighing devices, a difference between a new weight value and a previous weight value and to determine the new center-of-mass coordinates from the four differential values.

15. The shelf bracket assembly as recited in claim 1, wherein the thickness of the metal plate is between 1.5 mm and 6 mm.

16. The shelf bracket assembly as recited in claim 7,
wherein the interconnection of the two strain gauges disposed on the top side and the two strain gauges disposed on the top side are provided on a strain gauge film, and
wherein the interconnection of the two strain gauges disposed on the bottom side and the two strain gauges disposed on the bottom side being provided on another strain gauge film.

17. A shelf bracket assembly capable of being mounted on a vertically disposed shelf upright the shelf bracket assembly comprising:
at least one weighing device;
an anchoring device; and
a cantilever for supporting a shelf panel, wherein, in a condition where the shelf bracket assembly is mounted on the shelf upright, the cantilever projects from the shelf upright in a substantially horizontal direction, wherein the cantilever comprises a vertically disposed metal plate, wherein in a Cartesian coordinate system, an extent of the cantilever in a horizontal plane defines a Y-direction, a vertical direction defines a Z-direction, and a direction perpendicular to the Y-direction and the Z-direction defines an X-direction, wherein the at least one weighing device comprises:
  a force-introduction section;
  a linkage section; and
  a force-supporting section, wherein the linkage section comprises two weighing plates extending horizontally and parallel to each other, wherein the force-supporting section and the force-introduction section are at least partially formed of vertically extending metal plates, wherein the force-introduction section comprises a stabilizing member, the stabilizing member being in the form of a metal plate oriented in the X-direction and the Z direction.

* * * * *